UNITED STATES PATENT OFFICE.

CHARLES McBURNEY, OF ROXBURY, MASSACHUSETTS.

IMPROVEMENT IN THE MANUFACTURE OF HARD RUBBER.

Specification forming part of Letters Patent No. 53,643, dated April 3, 1866.

*To all whom it may concern:*

Be it known that I, CHARLES McBURNEY, of Roxbury, in the county of Norfolk and State of Massachusetts, have invented certain new and useful Improvements in the Manufacture of Hard Rubber; and I do hereby declare the following to be a full, clear, and exact description of the same.

My invention consists in a new method of employing waste vulcanized rubber in the manufacture of hard rubber or vulcanite, which method, to my knowledge, has not been used heretofore for this purpose.

The product known as "hard rubber" or "vulcanite" is composed chiefly of the best quality of gum, (or at least more than half its weight being of the best gum,) the other ingredients being sulphur, litharge, white lead, magnesia, and lamp-black in various quantities. Some of these articles may be omitted, but in all cases more than half of the compound must be of the best, and consequently most expensive, quality of gum; hence the compound is too expensive for application to many purposes in which it would be very useful if it could be obtained at a less cost than the present.

My invention has for its object the production of a compound possessing mainly the properties of the hard rubber now in use at a much smaller cost, and thus extending its application to many useful purposes from which it is excluded by its present high cost.

In order that my invention may be understood by those skilled in the art of manufacturing hard rubber, so as to enable them to make and use my said invention, I will give in detail the proportions of the ingredients and my methods of treatment.

Referring to my patent for utilizing waste vulcanized rubber of August 20, 1861, I take of the compound therein described twenty pounds—four pounds best rubber, (crude,) four to six pounds sulphur, one or two pounds lamp-black, from one-quarter to one pound calcined magnesia, and for some purposes one or more pounds litharge or white lead. The proportions of all these articles may vary, or some of them may be omitted in some cases. These are thoroughly mixed and ground together in the usual manner—namely, in friction-roll machines, such as are in common use in rubber factories. After the mass is thoroughly amalgamated it is reduced to thin sheets of any required convenient thickness by means of calendering-rolls, such as are in common use in rubber factories for similar purposes, to be cut up and molded and used in the various ways in which it may be employed.

To explain myself more fully, I will describe the manner of covering an iron roll or shaft of any dimensions. The sheet is taken from the calendering-machine, and while still in a plastic state is cut into pieces of the necessary dimensions to cover the roll (round) and one or more plies fitted on to produce the required thickness. The roll is then wrapped very tightly with cotton or linen cloth, as many wrappings being used as may be necessary to prevent its swelling during the heating or vulcanizing process. In this condition it is submitted to steam heat direct in any suitable receptacle, (usually in an iron cylinder,) steam being admitted by a pipe from a steam-boiler. The duration and temperature of the heat must be varied according to the bulk and thickness of the articles to be heated. Therefore it is impossible to give precise rules applicable to all cases, judgment and experience being necessary; but the heat may range from 250° to 280° Fahrenheit, and the time from three to eight hours. Articles of an irregular form which cannot be wrapped in cloth may be embedded in and covered with dry sand, pipe-clay, or similar materials in a suitable receptacle for the purpose of undergoing the vulcanizing process.

I do not claim as my invention either hard rubber or the use of any of the mineral ingredients or the heating process; but

What I claim as my invention, and desire to secure by Letters Patent, is—

The use of waste-rubber for the production of hard rubber, as set forth.

In testimony whereof I have signed my name to this specification before two subscribing witnesses.

CHARLES McBURNEY.

Witnesses:
 H. H. McBURNEY,
 JAMES WILSON.